United States Patent
Zhang

(10) Patent No.: US 7,307,953 B2
(45) Date of Patent: Dec. 11, 2007

(54) SCHEDULING FOR NON-REAL-TIME SERVICES IN ORTHOGONAL FREQUENCY DIVISION MULTIPLEX (OFDM) SYSTEMS

(75) Inventor: Guodong Zhang, Farmingdale, NY (US)

(73) Assignee: InterDigital Technology Corporation, Wilmington, DE (US)

(*) Notice: Subject to any disclaimer, the term of this patent is extended or adjusted under 35 U.S.C. 154(b) by 442 days.

(21) Appl. No.: 11/082,273

(22) Filed: Mar. 17, 2005

(65) Prior Publication Data

US 2005/0207341 A1    Sep. 22, 2005

Related U.S. Application Data

(60) Provisional application No. 60/553,845, filed on Mar. 17, 2004.

(51) Int. Cl.
*H04L 1/00* (2006.01)
*H04K 1/10* (2006.01)

(52) U.S. Cl. ........................ 370/232; 375/260
(58) Field of Classification Search ............ 370/232, 370/208; 375/260
See application file for complete search history.

(56) References Cited

U.S. PATENT DOCUMENTS

2005/0207341 A1* 9/2005 Zhang .................. 370/232
2006/0078059 A1* 4/2006 Ok et al. ............... 375/260

* cited by examiner

*Primary Examiner*—William D. Cumming
(74) *Attorney, Agent, or Firm*—Volpe and Koenig, P.C.

(57) ABSTRACT

Sub-carriers are allocated among the plurality of users in the OFDM system based on normalized channel gain values. Then, data bits are allocated for transmission on the allocated sub-carriers based on incremental transmission cost values. The channel gain values and the incremental transmission cost values are computed using a calculated fairness factor for each user in the system.

11 Claims, 4 Drawing Sheets

SCHEDULING FOR NON-REAL-TIME SERVICES IN ORTHOGONAL FREQUENCY DIVISION MULTIPLEX (OFDM) SYSTEMS

CROSS REFERENCE TO RELATED APPLICATIONS

This application claims the benefit of U.S. provisional application No. 60/553,845, filed on Mar. 17, 2004, which is incorporated by reference as if fully set forth.

FIELD OF INVENTION

The present invention relates to OFDM systems. More particularly, the present invention is a method and apparatus for scheduling non-real-time services in multi-user OFDM systems.

BACKGROUND

Future wireless communication networks will provide broadband services such as wireless Internet access to subscribers. Those broadband services require reliable and high-rate communications over hostile mobile environments with limited spectrum and intersymbol interference (ISI) caused by multipath fading. Orthogonal frequency division multiplex (OFDM) is one of the most promising solutions to address the ISI problem. In fact, OFDM has been chosen for European digital audio and video broadcasting, and wireless local area network (WLAN) standards, such as, for example, 802.11a.

In single user OFDM systems, techniques such as the water-filling approach may be utilized to determine an appropriate sub-carrier and bit allocation solution that minimizes total transmit power. In multi-user OFDM systems, however, such determinations are much more difficult. Sub-carriers in a multi-user system, for example, may be desirable to more than one user at the same time. Such variables add a great deal of complexity to the determining of optimal power allocation schemes, i.e., the scheduling of non-real-time (NRT) services.

Existing approaches directed at scheduling NRT services in multi-user systems utilize a non-linear optimization approach, such as, for example, the Lagrangian heuristic procedure with relaxation. These non-linear approaches, however, require intensive computations and are incapable of yielding optimal solutions. At most, such approaches yield only lower and upper bounds.

None of the existing approaches, including the non-linear approaches discussed above, consider 'fairness' between users in scheduling NRT services. Fairness, as further described below, is an indication of the quality of services (QoS) experienced by one user in the system versus the QoS expected, or the QoS experienced by other users in the system. By not considering fairness, the QoS experienced by certain users will be far superior to the QoS experienced by other users.

To illustrate, consider FIG. 1. In a multi-user OFDM network 100, base station 110 is servicing wireless transmit/receive units (WTRUs) 102, 104, and 106. Each WTRU has a respective channel gain $G_{k,n}$ on a particular sub-carrier, where k represents the sub-carrier and n represents the user, or in this case, the WTRU. As illustrated in the Figure, WTRU 102 has a channel gain on sub-carrier k equivalent to $G_{k,102}$. Similarly, WTRUs 104 and 106 have channel gain values of $G_{k,104}$ and $G_{k,106}$, respectively. If, for example, WTRU 102 has a higher channel gain value $G_{k,102}$ than the other WTRUs 104, 106, sub-carrier k will be allocated to WTRU 102. As long as WTRU 102 continues to have a channel gain value $G_{k,102}$ superior to that of WTRUs 104 and 106, it will continue to occupy sub-carrier k, and thus continue to experience superior system performance. In the mean time, WTRUs 104 and 106 continue to suffer sub-par performance at the expense of WTRU 102. If fairness between users were utilized in system 100, however, WTRUs 102, 104 and 106 would all experience comparable system performance, in spite of their individual channel gain values.

Accordingly, it is desirable to have a method and apparatus for scheduling NRT services in a multi-user wireless OFDM system that considers and maintains fairness between users and does not require intense computations.

SUMMARY

The present invention relates to a method and apparatus for scheduling non-real-time (NRT) services in a wireless, multi-user orthogonal frequency division multiplexing (OFDM) communication system. First, sub-carriers are allocated among the plurality of users in the OFDM system based on normalized channel gain values. Then, data bits are allocated for transmission on the allocated sub-carriers based on incremental transmission cost values. The channel gain values and the incremental transmission cost values are computed using a calculated fairness factor for each user in the system.

DETAILED DESCRIPTION OF THE PREFERRED EMBODIMENTS

Figure 1:
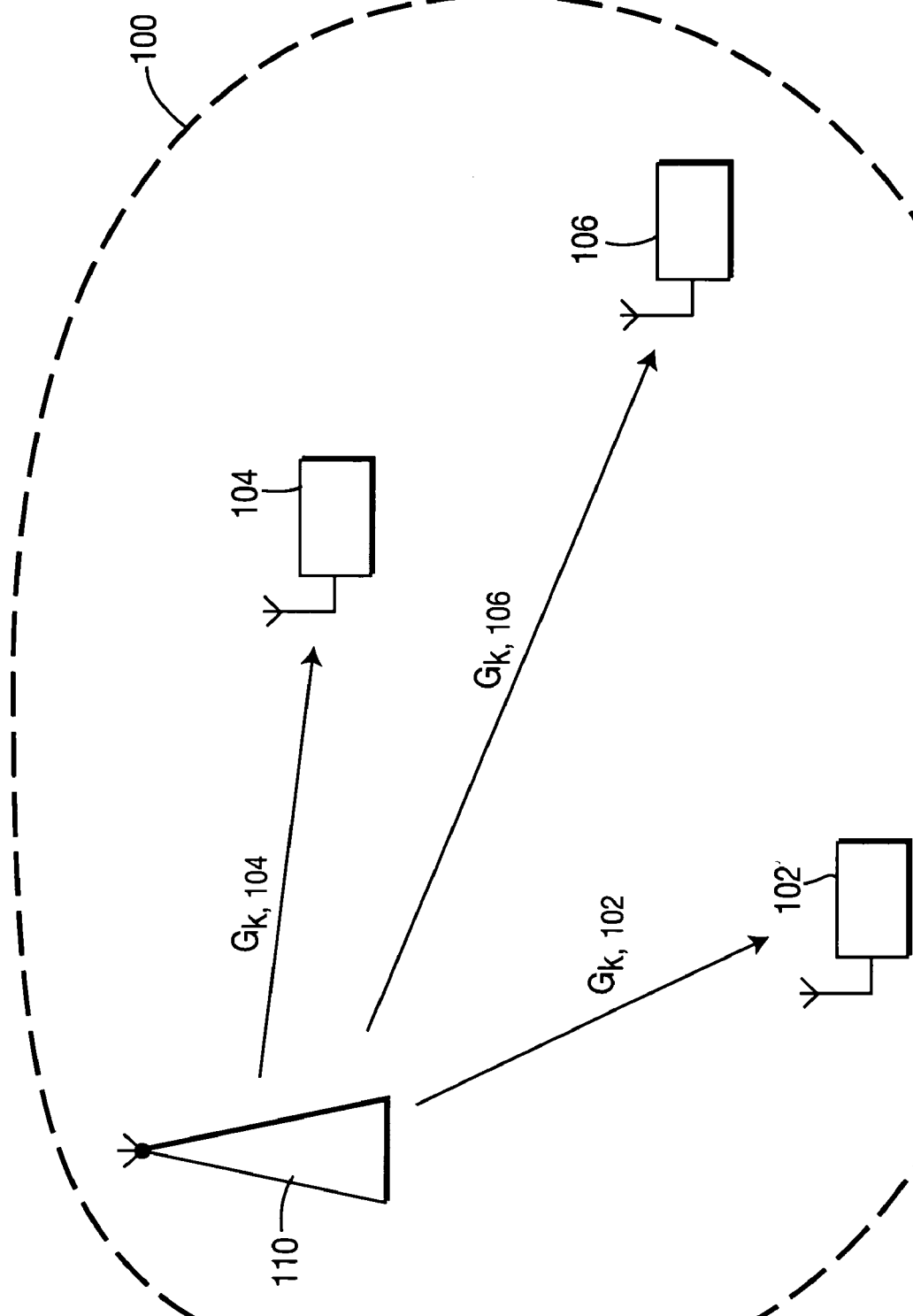
FIG. 1 is a wireless, multi-user orthogonal frequency division multiplexing (OFDM) system.

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

In a wireless Orthogonal Frequency Division Multiplexing (OFDM) system, non-real time (NRT) services for multiple users are scheduled such that the system's resources are efficiently utilized while maintaining a consistent quality of service (QoS) level amongst the users. Sub-carriers are first individually allocated amongst the users, followed by a bit-by-bit allocation of data bits for transmission on the sub-carriers. The sub-carrier and bit allocation functions of the present embodiment consider 'fairness' to the users in performing their respective allocation duties.

Fairness, as described herein, is a factor unique to each user in the OFDM system. This fairness factor indicates the quality of services being provided to each user as compared to the QoS expected or the QoS being experienced by other users in the system. In determining the users' fairness factors, any quality metric deemed appropriate may be utilized. Data transmission rate, bit error rate, and the like, for example, may be utilized to determine a fairness factor for each user in the system.

In allocating the system's sub-carriers amongst the users, a channel gain value for each user on each sub-carrier is determined. Next, these channel gain values are normalized using each user's fairness factor. Each sub-carrier is then allocated to the user with the highest normalized channel gain value on the respective sub-carrier. It should be noted that this method of allocation allocates each sub-carrier to at most one user (i.e., the one user with the highest normalized channel gain on that sub-carrier), thus avoiding interference that may arise from multiple users utilizing a single sub-carrier at the same time. On the other hand, multiple sub-carriers may be allocated to a single user. In fact, those users with the lowest fairness factors are more likely to receive multiple sub-carriers, so as to compensate for their inferior QoS levels.

Once the sub-carriers are allocated to the users in the OFDM system, a normalized water-filling algorithm is utilized to allocate data bits on a bit-by-bit basis for transmission on the sub-carriers. To allocate a data bit for transmission, an incremental 'cost' value for transmitting one bit of data on each sub-carrier is calculated. This incremental cost value is the additional power required to transmit one bit of a user's data on one of the sub-carrier(s) allocated to the user, multiplied by the user's fairness factor. Once an incremental cost value is calculated for each sub-carrier, the sub-carrier yielding the lowest incremental cost value, while not exceeding a maximum allowable transmit power constraint, is selected to transmit this data bit. It should be noted that this data bit is of the user to whom the selected sub-carrier is allocated.

This allocation process is then repeated until all bits are allocated for transmission, or until the maximum allowable transmit power constraint is reached, whichever occurs first. Utilizing this normalized water-filling bit allocation technique not only maximizes the amount of data that is transmitted, but it does so 'fairly' and without exceeding the maximum allowable transmit power.

Figure 2:
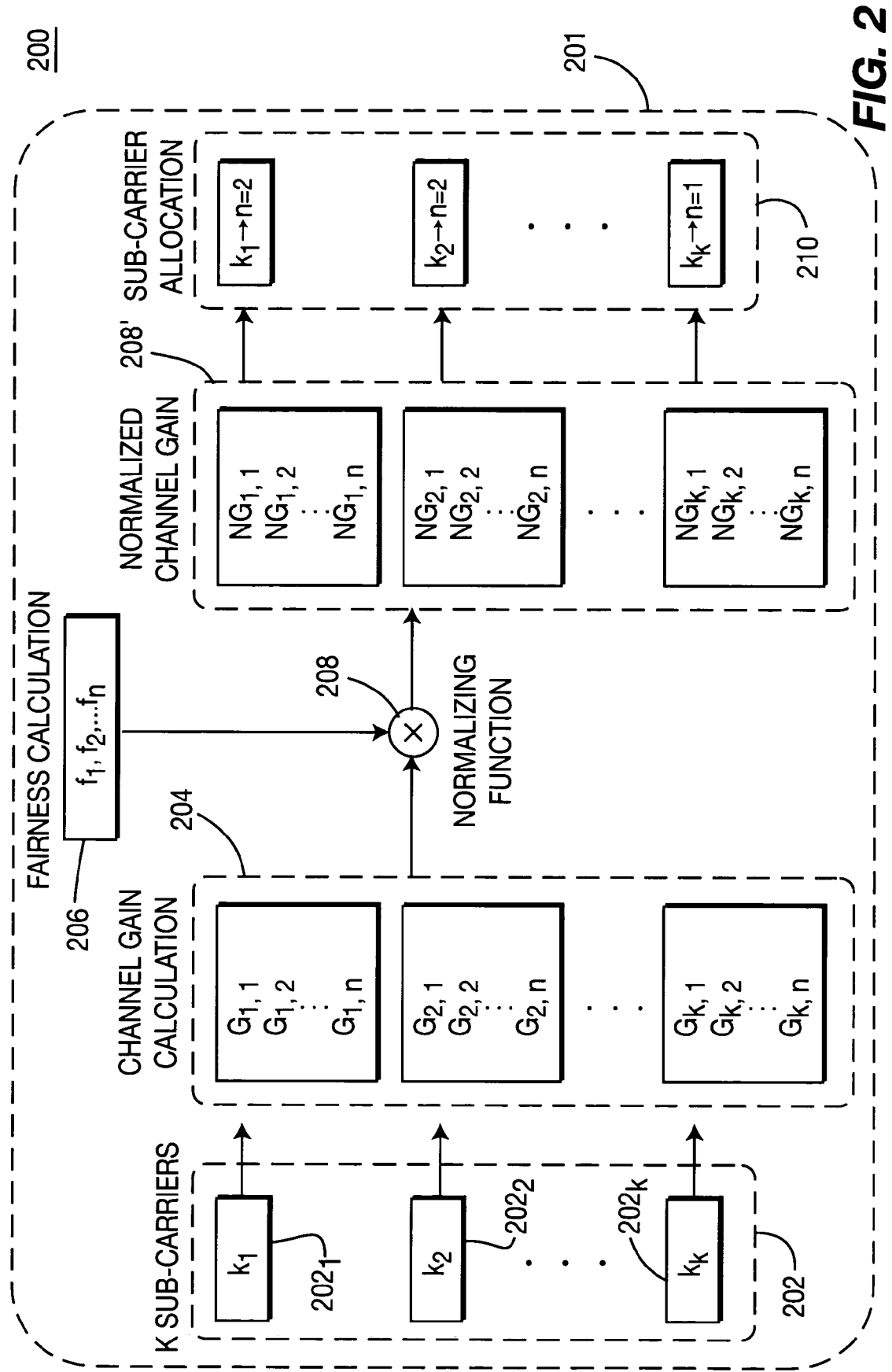
FIG. 2 is a sub-carrier allocation device configured to operate in a wireless, multi-user OFDM system.

Referring now to FIG. 2, a sub-carrier allocation device 201 configured to operate in a servicing base station is shown operating in a wireless, multi-user OFDM system 200. The present device 201 comprises a calculating instantaneous channel gain values device 204; a calculating a fairness factor for each user in the system 200 device 206; a normalizing the calculated channel gain values using the fairness factors device 208; and an allocating each sub-carrier $202_1$-$202_k$ in the system 200 to the user with the highest normalized gain values on that sub-carrier device 210. For purposes of this illustration, it is assumed that there are N users and K sub-carriers in the multi-user OFDM system 200. Utilizing the gain calculation device 204, the sub-carrier allocation device 201 calculates a channel gain value $G_{k,n}$ for each user on each sub-carrier $202_1$-$202_k$ in the system 200, where $G_{k,n}$ represents the channel gain value between the $n^{th}$ user and a servicing base station on the $k^{th}$ sub-carrier. A fairness factor $f_n$ for each user is then determined utilizing the fairness calculation device 206, where $f_n$ denotes the fairness factor for the $n^{th}$ user.

As previously described, any quality metric deemed appropriate may be utilized in determining fairness. Regardless of the metric utilized, however, the fairness factors should be indicative of: 1) a user's resource usage as compared to the resource usage of other users in the OFDM system 200 during a given time frame; or 2) actual system performance experienced by a user versus the system performance expected and/or required by the user. Performance may indicate a user's experienced throughput, delay, data rate, etc. An example definition of fairness as described herein is given by Equation 1 below:

$$\text{fairness}(n) = \frac{R_{ave}(n)}{R(n)} \qquad \text{Equation 1}$$

where R(n) may denote, for example, the data rate configured by the system 200 for user n, i.e., the data rate expected by user n, and $R_{ave}(n)$ is the average data rate actually experienced by user n over a specified period of time. According to Equation 1, if user n experiences a lower data rate than expected, his fairness factor will be relatively low. Alternatively, experiencing a data rate at or above what is expected will result in a relatively high fairness factor for user n. It should be noted that Equation 1 is but one example formula for determining fairness. This formula may be manipulated to accommodate other performance metrics, such as delay or bit error rate (BER), whose desirability increases as their values decrease. If delay, for example, were selected as the performance metric by which fairness is to be determined, Equation 1 might be modified such that fairness(n) equals D(n) divided by $D_{ave}(n)$, where D(n) denotes the delay configured by the system 200 for user n, and $D_{ave}(n)$ denotes the average delay actually experienced by user n over a specified period of time. Accordingly, if a user n were experiencing a higher delay than expected, his fairness would be relatively low, while experiencing a lower delay than expected would result in a higher fairness factor.

Referring back to FIG. 2, once a fairness factor f(n) is calculated for each user n in the OFDM system 200, each user's calculated channel gain values ($G_{k,n}$) are normalized according to the user's calculated fairness factor f(n) utilizing a normalizing function in the normalizing device 208. The resulting normalized channel gain values ($NG_{k,n}$) 208' may be expressed according to Equation 2 below:

$$NG_{k,n} = \frac{G_{k,n}}{\text{fairness}(n)}. \qquad \text{Equation 2}$$

The allocation device 210 then allocates each sub-carrier k to the user n with the highest normalized channel gain value $NG_{k,n}$ on that sub-carrier. As shown in the Figure, sub-carriers $k_1$ and $k_2$ ($202_1$, $202_2$) are allocated to user 2, thus it follows that the normalized gain values $NG_{1,2}$, $NG_{2,2}$ for user 2 on sub-carriers $k_1$ and $k_2$ ($202_1$, $202_2$) are higher than the normalized gain values of any other user on sub-carriers $k_1$ and $k_2$ ($202_1$, $202_2$). Similarly, since sub-carrier $k_k$ ($202_k$) is allocated to user 1, user 1 has a higher $NG_{k,1}$ value on sub-carrier $k_1$ ($202_k$) than any other user.

Once all of the sub-carriers $202_1$-$202_k$ have been allocated amongst the users in the system 200, the number of bits that will be transmitted on each sub-carrier $202_1$-$202_k$ is determined.

Figure 3:
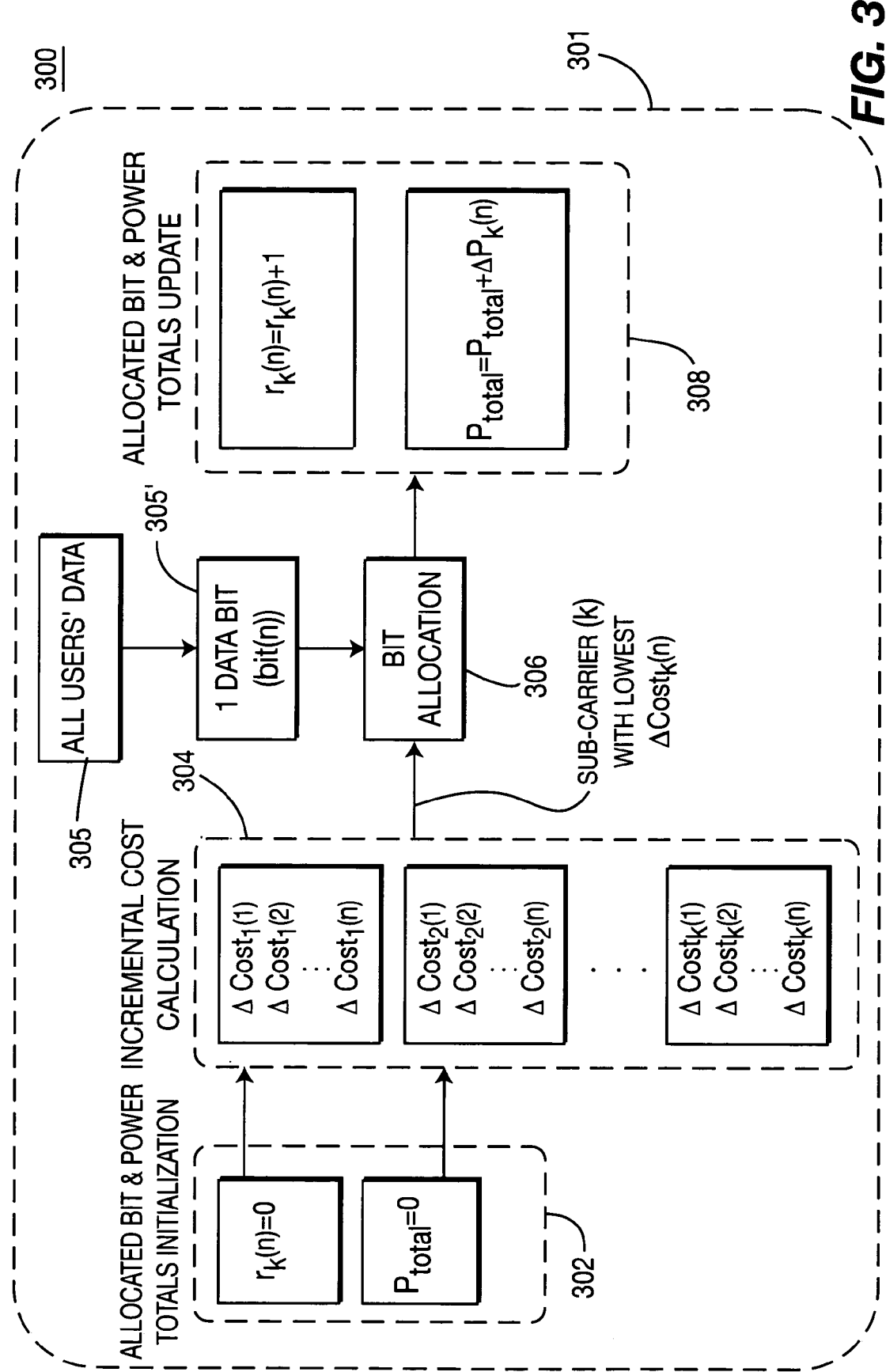
FIG. 3 is a bit allocation device configured to operate in a wireless, multi-user OFDM system.

Referring now to FIG. 3, a bit allocation device 301 configured to operate in a servicing base station according to a normalized water-filling algorithm is shown operating in a wireless, multi-user OFDM system 300. The bit allocation device 301 has an initializing device 302; an incremental cost calculating device 304; a bit allocating device 306; and an allocated bit and total transmit power updating device 308.

For purposes of this Figure, let $f_n(r)$ denote a required received power when r bits of a user n are transmitted on a sub-carrier k. Further, let $BER_n$ denote a required bit error rate (BER) of a user n. If the system 300 utilizes M-ary QAM, for example, then the required power to transmit r bits per symbol in OFDM system 300 may be expressed according to Equation 3 below:

$$f_n(r) = \frac{N_0}{3} \cdot \left[Q^{-1}\left(\frac{BER_n}{4}\right)\right]^2 \cdot (2^r - 1), \qquad \text{Equation 3}$$

where $N_0$ is background noise at each sub-carrier. If $r_k(n)$ is utilized to represent the number of bits of an $n^{th}$ user allocated to a $k^{th}$ sub-carrier, in order to maintain a desired quality of service (QoS) level, the allocated transmit power on the $k^{th}$ sub-carrier may be expressed as in Equation 4 below:

$$P_k(n) = \frac{f_n(r_k(n))}{G_{k,n}^2}; \qquad \text{Equation 4}$$

where $G_{k,n}$ is the channel gain between a user n and a base station on a $k^{th}$ sub-carrier. It should be understood that Equations 3 and 4 are merely examples of equations for estimating transmit-power. Other equations that adequately estimate transmit-power may be utilized without departing from the scope of the present embodiment.

Referring back to FIG. 3, the initialization device 302 initializes the number of bits allocated to each user n on a $k^{th}$ sub-carrier $r_k(n)$, and the total allocated transmit power $P_{total}$, to zero. The total allocated transmit power $P_{total}$ is defined as the sum of all transmit powers on all sub-carriers, i.e., the sum of all $P_k(n)$ for all k sub-carriers. In a real system, such as OFDM system 300, $P_{total}$ may not exceed a maximum allowable transmit power constraint $P_{max}$ specified for the servicing base station.

Once $r_k(n)$ and $P_{total}$ are initialized to zero, the incremental cost calculating device 304 calculates an incremental cost $\Delta Cost_k(n)$ required to transmit one additional bit 305' of each user n's data 305 on each sub-carrier carrier k allocated to said user n. The incremental cost value is the additional transmission power required to transmit one bit of user n's data on a sub-carrier k allocated to user n multiplied by user n's fairness factor, as expressed below in Equation 5:

$$\Delta Cost_k(n) = \Delta P_k(n) \text{ fairness}(n); \qquad \text{Equation 5}$$

where $\Delta P_k(n)$ is the additional transmission power required to transmit this one bit, which may further be expressed according to Equation 6:

$$\frac{f_n(r_k(n)+1) - f_n(r_k(n))}{G_{k,n}^2}. \qquad \text{Equation 6}$$

Combining Equations 5 and 6 the incremental cost to transmit one additional bit of user n's data on a sub-carrier k allocated to user n may be expressed as in Equation 7:

$$\Delta Cost_k(n) = \left(\frac{f_n(r_k(n)+1) - f_n(r_k(n))}{G_{k,n}^2}\right) \cdot \text{fairness}(n). \qquad \text{Equation 7}$$

The sub-carrier k with the lowest incremental transmission cost $\Delta Cost_k(n)$ that does not exceed the maximum allowable transmission power constraint $P_{max}$, i.e., $P_{total} + \Delta P_k(n) \leq P_{max}$, is selected to transmit one additional bit of data 305' by the bit allocation device. 306. This additional bit of data belongs to the user n to which the selected sub-carrier k was previously allocated. If such a sub-carrier k is identified, the updating device 308 updates the number of bits allocated to the selected sub-carrier by one and increases the total allocated transmit power $P_{total}$ by the $\Delta P_k(n)$ required to transmit this one bit 305'. The bit allocation device 301 then processes the next bit of data in a similar manner, beginning with the incremental cost calculating device 304 until either all bits are allocated, or until $P_{max}$ is reached, whichever occurs first.

If, however, such a sub-carrier is not identified, i.e., allocating an additional bit to the sub-carrier k with the lowest transmission cost causes $P_{total}$ to exceed $P_{max}$, (i.e., the total allocated transmit power exceeds the maximum allowable transmission power constraint), no more bits are allocated due to lack of transmission power.

Figure 4:
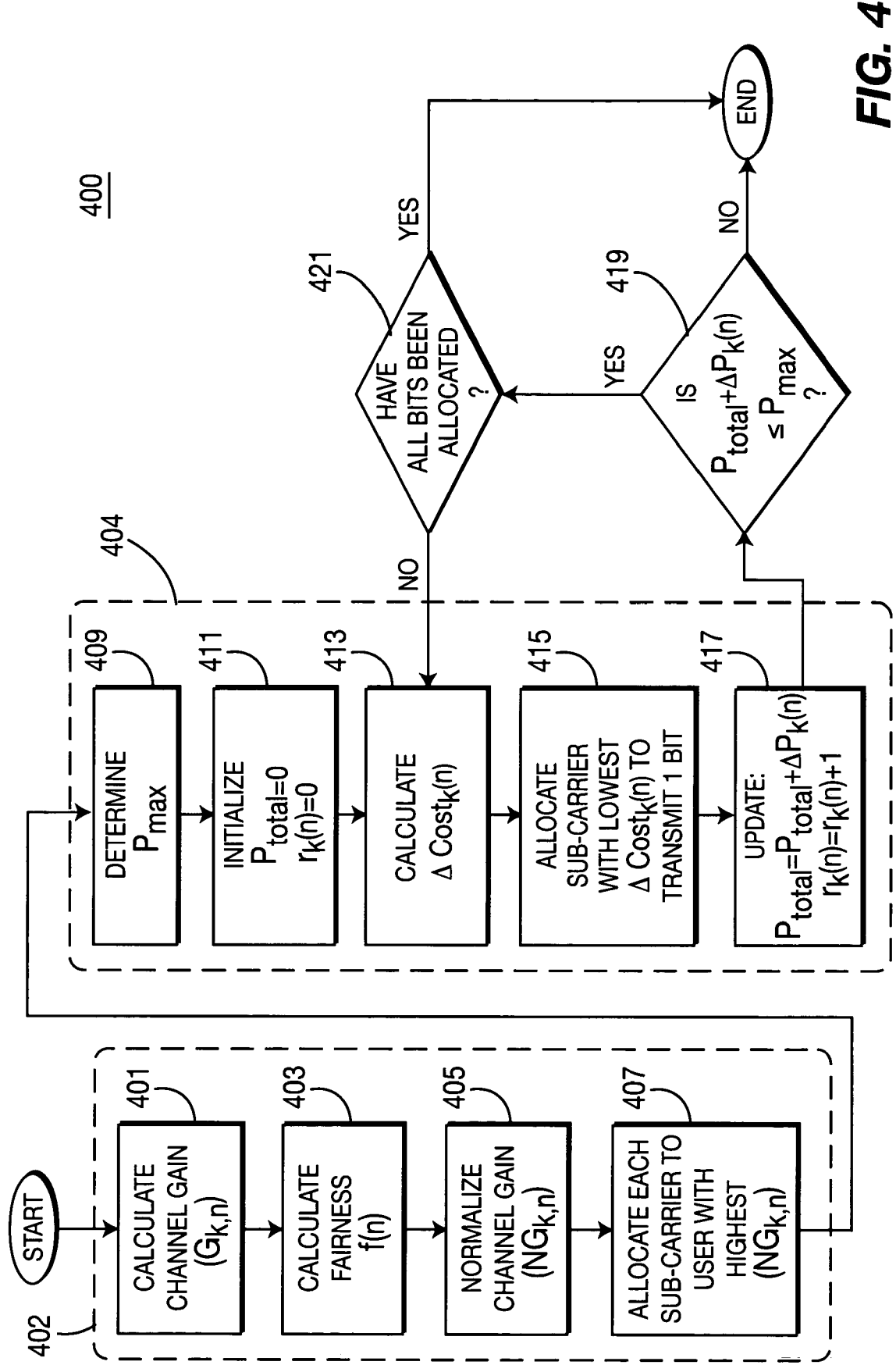
FIG. 4 is a flow diagram for scheduling non-real-time services in a wireless, multi-user OFDM system.

A flow diagram for scheduling of non-real time services, i.e., scheduling transmission of data to multiple users in an OFDM system 400, is shown in FIG. 4. In a multi-user wireless OFDM system 400 having N users and K sub-carriers, each. sub-carrier k is allocated to a user n (step 402). A channel gain value $G_{k,n}$ is calculated for each user n on each sub-carrier k (step 401). A fairness factor f(n) for each user in the OFDM system 400 is then determined (step 403). Utilizing the fairness factors of step 403, each user's channel gain values of step 401 are normalized to yield a normalized channel gain value $NG_{k,n}$ for each user n on each sub-carrier k (step 405). Each sub-carrier k is then allocated to the user n with the highest $NG_{k,n}$ value on that sub-carrier k (step 407).

Once all the sub-carriers have been allocated to the users (step 402), data bits are allocated for transmission on the sub-carriers (step 404). A maximum allowable transmit power constraint $P_{max}$ is determined (step 409). Then, a total allocated transmit power value $P_{total}$, and a total number of bits allocated to each $n^{th}$ user on a $k^{th}$ sub-carrier $r_k(n)$ are initialized to zero (step 411). An incremental transmit cost value $\Delta Cost_k(n)$ for transmitting an additional bit of each n user's data on each sub-carrier k allocated to said user n is calculated (step 413). Each n user's calculated incremental cost value(s) (from step 413) accounts for each n user's fairness factor (from step 403). The sub-carrier k with the lowest incremental transmission cost $\Delta Cost_k(n)$ that does not exceed $P_{max}$ (from step 409) is selected to transmit one additional bit of data (step 415). This additional bit of data belongs to the user n to which the selected sub-carrier k was previously allocated (step 407). The total allocated transmit power $P_{total}$ and the total number of bits allocated to the $n^{th}$ user on a $k^{th}$ sub-carrier $r_k(n)$ are then updated accordingly (step 417). If $P_{total}$ of step 10 is less than or equal to $P_{max}$ (step 419), steps 413-417 are repeated until all bits in the system 400 are allocated (step 421) or until $P_{total}$ exceeds $P_{max}$.

Although the elements in the Figures are illustrated as separate elements, these elements may be implemented on a single integrated circuit (IC), such as an application specific integrated circuit (ASIC), multiple ICs, discrete components, or a combination of discrete components and IC(s). Although the features and elements of the present invention are described in the preferred embodiments in particular combinations, each feature or element can be used alone without the other features and elements of the preferred embodiments or in various combinations with or without other features and elements of the present invention. Furthermore, the present invention may be implemented in any type of wireless communication system.

What is claimed is:

1. In a wireless orthogonal frequency division multiplexing (OFDM) communication system, a method of scheduling non-real time data transmissions to a plurality of users, the method comprising:
   (a) allocating sub-carriers among the plurality of users based on normalized channel gain values; and
   (b) allocating bits of data for transmission on the allocated sub-carriers based on incremental transmission cost values.

2. The method of claim 1 wherein the sub-carrier allocation step (a) further comprises:
   (a1) determining a channel gain value for each user on each sub-carrier;
   (a2) calculating a fairness value for each user in the OFDM system;
   (a3) normalizing each user's determined channel gain values from step (a1) with said user's calculated fairness value from step (a2); and
   (a4) allocating each sub-carrier to the one user with the highest normalized channel gain value on each said sub-carrier.

3. The method of claim 2 wherein the bit allocation step (b) further comprises:
   (b1) determining a maximum allowable transmit power;
   (b2) initializing a total allocated transmit power value and a total number of bits allocated for transmission value to zero;
   (b3) calculating an incremental cost value for transmitting one bit of data to each user on each of the sub-carrier(s) allocated to said users;
   (b4) allocating to the sub-carrier with the lowest incremental cost value one bit of data for transmission to the user to whom said sub-carrier was allocated;
   (b5) increasing the total allocated transmit power value by a transmit power value required to transmit the allocated bit;
   (b6) increasing the total number of bits allocated for transmission value by one; and
   if the total allocated transmit power value of step (b5) is less than the maximum allowable transmit power of step (b1):
   (b7) repeating steps (b3) through (b6).

4. The method of claim 3 wherein the incremental cost value is the additional power required to transmit one bit of a user's data on one of the sub-carrier(s) allocated to said user, multiplied by the user's fairness factor.

5. The method of claim 2 wherein each fairness value is a measure of system resources consumed by one user versus system resources consumed by the other users during a predetermined period of time.

6. The method of claim 2 wherein each fairness value is a ratio of a system performance metric experienced by a user over a predetermined period of time versus a system performance metric expected by the users over the period of time.

7. The method of claim 6 wherein the system performance metric is data throughput rate.

8. The method of claim 6 wherein the system performance metric is bit error rate (BER) or delay.

9. A base station configured to schedule non-real time data transmissions to a plurality of users in a wireless OFDM system, the base station comprising:
   means capable of allocating sub-carriers among the plurality of users based on normalized channel gain values; and
   means capable of allocating bits of data for transmission on the allocated sub-carriers based on incremental transmission cost values.

10. The base station of claim 9 further comprising:
    means capable of determining a channel gain value for each user on each sub-carrier;
    means capable of calculating a fairness value for each user in the OFDM system;
    means capable of normalizing each user's determined channel gain values with said user's calculated fairness value; and
    means capable of allocating each sub-carrier to the one user with the highest normalized channel gain value on each said sub-carrier.

11. The base station of claim 10 further comprising:
    means capable of determining a maximum allowable transmit power;
    means capable of initializing a total allocated transmit power value and a total number of bits allocated for transmission value to zero;
    means capable of calculating an incremental cost value for transmitting one bit of data to each user on each of the sub-carrier(s) allocated to said users;
    means capable of allocating to the sub-carrier with the lowest incremental cost value one bit of data for transmission to the user to whom said sub-carrier was allocated;
    means capable of increasing the total allocated transmit power value by a transmit power value required to transmit the allocated bit; and
    means capable of increasing the total number of bits allocated for transmission value by one.

* * * * *

UNITED STATES PATENT AND TRADEMARK OFFICE
CERTIFICATE OF CORRECTION

PATENT NO. : 7,307,953 B2  Page 1 of 1
APPLICATION NO. : 11/082273
DATED : December 11, 2007
INVENTOR(S) : Guodong Zhang It is certified that error appears in the above-identified patent and that said Letters Patent is hereby corrected as shown below:

IN THE SPECIFICATION

At column 2, line 6, before "WTRUs", delete "mean time" and insert therefor --meantime--.

At column 5, delete Equation 5, and insert therefor --$\Delta Cost_k(n) = \Delta P_k(n) \cdot fairness(n)$--.

At column 6, line 7, after the figure "6", insert --,--.

At column 7, line 1, before the words "is less", delete "step 10" and insert therefor --(step 417)--.

Signed and Sealed this

Sixth Day of May, 2008

JON W. DUDAS
*Director of the United States Patent and Trademark Office*